UNITED STATES PATENT OFFICE.

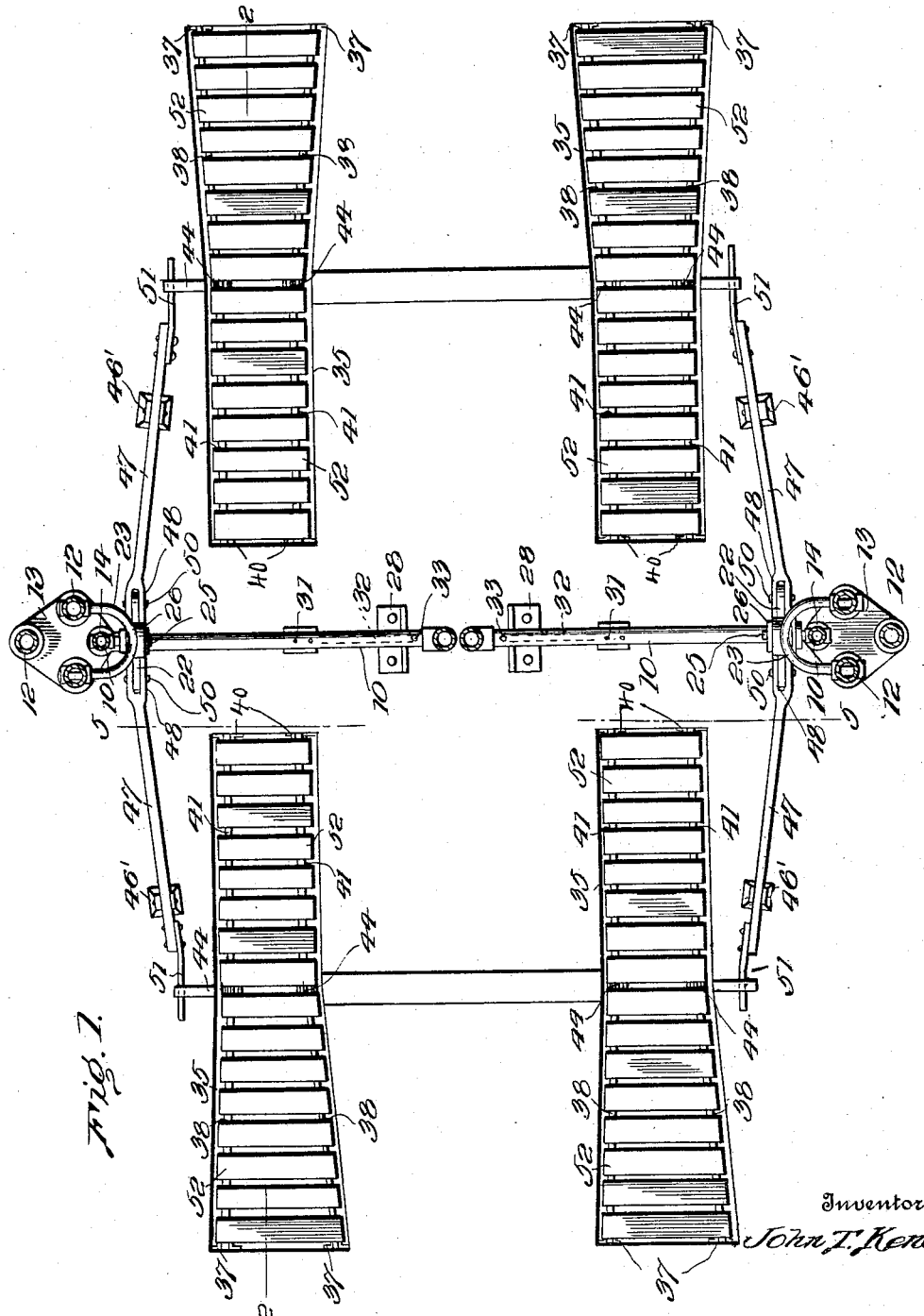

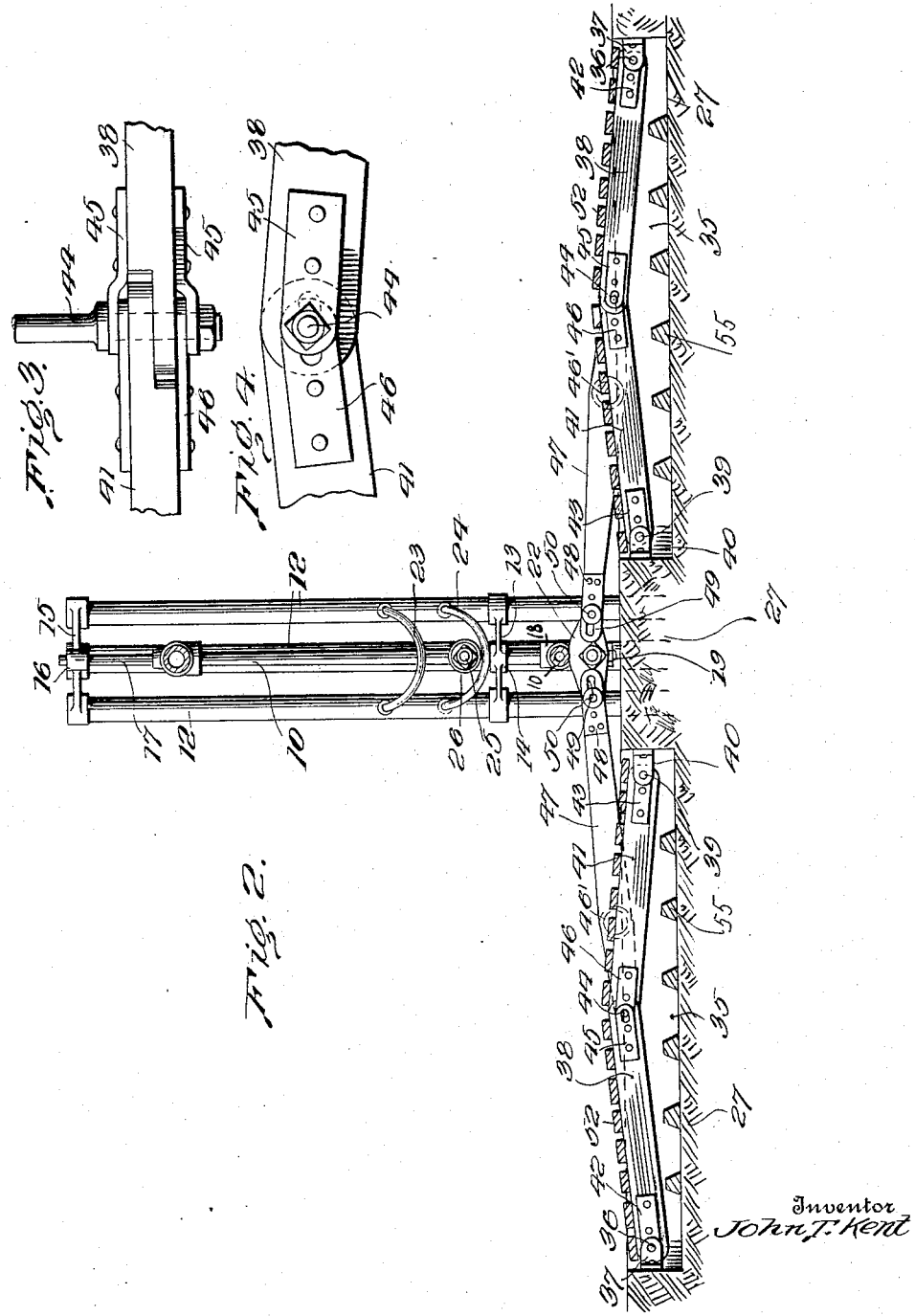

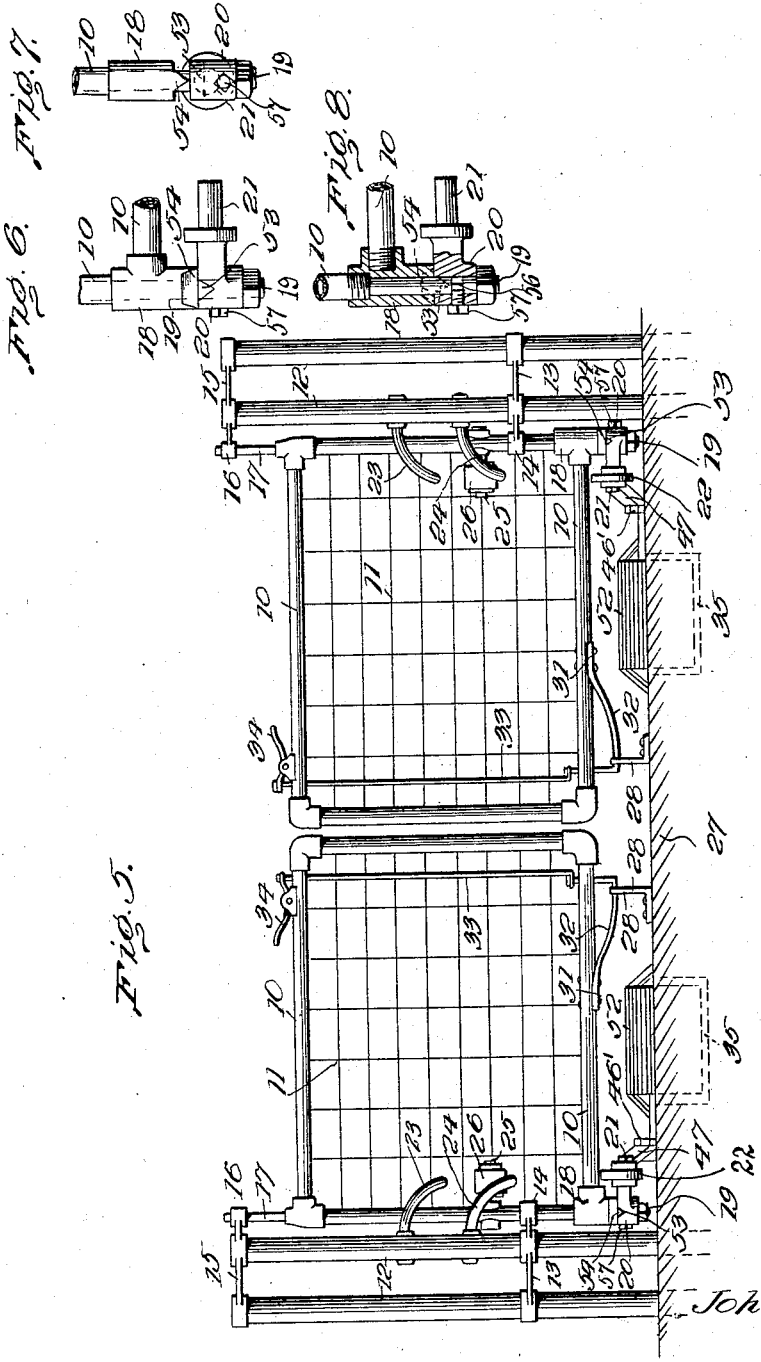

JOHN T. KENT, OF DOUGLAS, ARIZONA.

GATE.

1,219,822. Specification of Letters Patent. Patented Mar. 20, 1917.

Application filed April 19, 1915. Serial No. 22,410.

*To all whom it may concern:*

Be it known that I, JOHN T. KENT, a citizen of the United States, residing at Douglas, in the county of Cochise and State of Arizona, have invented certain new and useful Improvements in Gates, of which the following is a specification.

This invention relates to improvements in gates, more particularly to gates adapted to be operated from a distance by a person approaching in vehicles of various kinds, including automobiles, motorcycles, or on horse back, and has for one of its objects to improve the construction and increase the efficiency and utility of devices of this character.

Another object of the invention is to provide a device of this character including coacting gates swinging in opposite directions, and with means whereby the gates may be opened simultaneously or one at a time, or from either direction, and so arranged that the gates may be opened or closed automatically in opposite directions.

With these and other objects in view, the invention consists in certain novel features of construction as hereinafter shown and described and then specifically pointed out in the claims; and in the drawings illustrative of the preferred embodiment of the invention—

Figure 1 is a plan view partly in section of the improved gates and their operating mechanism.

Fig. 2 is a sectional view on the line 2—2 of Fig. 1.

Figs. 3 and 4 are enlarged details illustrating the construction of the joints of the tilting platforms.

Fig. 5 is an elevation in section on the line 5—5 of Fig. 1, with the operating levers removed.

Figs. 6, 7 and 8 are enlarged details partly in section.

Corresponding and like parts are referred to in the following description and indicated in all the views of the accompanying drawings by the same reference characters.

The improved gate may be erected at any suitable point and may be constructed of any suitable material, and it is not desired therefore to limit the invention in this respect, but for the purpose of illustration, the gates are shown constructed of piping, indicated conventionally at 10, and provided with a webbing of strands of wire, indicated conventionally at 11.

At each side of the gate-way opening, supports are erected to which the gates are swingingly united. These supports may be of any suitable material or of any suitable form, but for the purpose of illustration, are shown formed of gas or steam piping, indicated at 12, and supported near their lower ends. Any required number of the members 12 may be employed, but generally three will be used for each support and grouped at uniform distances apart and connected near their lower ends by a spider member 13 which includes a guide 14 for the adjacent vertical member of the gate. At their upper ends the members 12 are connected by another spider-like member 15 which includes a guide sleeve 16 through which a guide rod 17 is slidably disposed, the guide rod being rigidly connected at its lower end in the gate structure. By this means the gates are free to swing laterally and are also movable vertically to a certain extent, the object to be hereafter explained. The lower horizontal member of each of the gates is rigidly coupled, as by a T 18 to the vertical member which is located next to the supporting members 12, while the upper horizontal members and the free ends of the lower horizontal members are connected by elbows to the vertical members, as shown in Fig. 5.

Slidably supported in each of the T's 18 is a depending stud 19 and rotatably supported upon each of the studs 19 is a collar 20 having a lateral stud 21. Mounted to swing upon each of the studs 21 is an arm 22, the stud 21 extending through the arms 22 intermediate its ends. The upper edge of the arm 21 is curved upwardly to a point approximately close to the lower face of the lower horizontal member of the gate, as shown more clearly in Fig. 2.

Any suitable means may be employed to hold the member 19 from longitudinal movement, such, for instance, as an annular groove or seat 56 in the member 19 and a stop pin 57 in the member 20 extending at its inner end into the channel, as shown in Fig. 8.

Connected to the members 12 which are located nearest to the gate are curved track members 23—24, and projecting from the adjacent vertical member of the gate is a stud 25 carrying a roller 26 which operates between the members 23—24. The members 23—24 are curved in one direction concentric to the adjacent vertical member of the gate, as shown in Fig. 1, and likewise curved downwardly as shown in Fig. 2. By this arrangement, it will be obvious that when the gate is elevated by a lifting force applied to the member 22 the rollers 26 will be caused to follow the path or track between the members 23—24 and thus swing the gate into open position, as hereafter more fully explained. The supporting members 12 are rigidly supported in any suitable manner, preferably by being embedded in a concrete foundation, indicated conventionally at 27.

Supported upon the road-way at the meeting point of the gates are stops 28, each including an upwardly directed web having a central notch, the webs at each side of the notch being inclined outwardly and downwardly. Attached at 31 to one or both of the gates is a resilient catch device 32 adapted to engage in the notch of the member 28. At its free end the member 32 extends through the adjacent gate member and is connected to a rod 33 which extends upwardly through the upper rail member of the gate and is connected to a small trip lever 34 upon the upper face of the gate. The lever 34 is convenient to the person who may desire to pass through the gate on foot and enables him to release the latch 32 and thus release the gate which may be swung to one side or the other without reference to the operating mechanism.

Formed in the road-way at each side of the gate way opening are pits, the pits being located in the path of the wheels of the vehicles which may pass through the gates. Four of the pits are required and are indicated conventionally at 35. The portions of the pit farthest from the gate-way opening are increased in width toward their outer ends as shown. The pits are designed to contain the devices which are operative by the wheels of the approaching vehicle and, as this operating mechanism is the same in each of the pits, a description of one will suffice for all. Pivoted at 36 in suitable brackets 37 at the outer end of each pit are rails 38, and pivoted at 39 in suitable brackets 40 at the inner end of each of the pits are rails 41. The rails may be of any suitable material, but for the purpose of illustration are shown formed of joists, the rails 38 having metal wear plates 42 engaging the pivots 36, while the rails 41 are provided with similar metal wear plates 43 engaging the pivots 39. At their confronting ends the rails 38—41 are preferably halved together and pivotally united at 44, the apertures for the pivots being necessarily slotted to enable the members 38—41 to be moved downwardly without cramping. Preferably metal wear plates 45—46 are attached to the members 38—41 and slotted to engage the pivots 44.

Pivoted at 46' to the road-bed externally of each of the pits 35 is a lever arm 47. The lever arms may be of any suitable material, but for the purpose of illustration are shown as if formed of wood and with metal plates 48 at their inner ends and slotted at 49 and engaging by their slots over pins 50 projecting from the member 22. The lever members 47 are thus pivoted to the member 22 at each side of its central pivot, as illustrated in Fig. 2. The pivot 44 is extended at one end to receive a resilient arm 51 extending from the lever 47. The beams 38—41 are spaced apart a certain distance and connected by slats or treads 52, preferably spaced slightly apart. The weight of the gate will necessarily retain them in their lower positions with the rollers 26 at the lowest point upon the lower guides 23 with the latches 32 engaged in the slots of the members 28, and the lever arms 47 and their pivots 46 are so disposed that, when the gate is in its lowest position, the tread members 38—41—52 will be in their elevated position, as illustrated in Fig. 2, and projecting at their centers a short distance above the general surface of the road-way.

By this simple arrangement, it will be obvious that when a vehicle approaches and the wheels strike the slats 52 carried by the rail members 38—41, the weight of the vehicle will depress the members 38—41 and their connected slats and thus elevate the longer end of the adjacent levers 47 and cause the members 22 to first rotate upon their pivots 21 until the upwardly curving face of the members 22 engage the lower rail members 10 of the gate. This movement first elevates the gate and also swings the member 22 upon its pivot and causes the upwardly curving portion of the member 22 to swing the gate slightly away from the approaching vehicle so that the rollers 26 are caused to move upwardly between the guide members 23—24 in a direction away from the approaching vehicle, and as the members 38—41 continue to move downwardly, the gate is elevated to a still greater extent and caused to follow the curved guide members 33—34 until the roller 26 is carried upwardly to a position approximately close to the nearest member 12. This movement likewise carries the gate into open position. Formed in the upper face of each of the collars 20 is a depression 53 while a corresponding projection 54 is formed upon the lower face of the T 18. The depressions 53 extend transversely of the gate, when the latter is closed, while the projection 54 extends in parallel relation to the gates. By this arrangement, when the gates are moved into open position, the projection 54 of each of the T's will drop into the adjacent depression 53 of each of the collars 20 and thus lock the gate in open position and prevent it from being prematurely closed. The coaction of the members 53—54 does not positively lock the gate in open position, but prevents it from being affected by the wind or other like force. As the vehicle passes through the gate-way opening the forward wheels will engage the slats 52 at the opposite side of the gate-way opening and thus hold the gate in its open position and prevent it from swinging against the passing vehicle. As the vehicle passes onward and carries its wheels off from the last of the slats 52, the weight of the gate will cause the rollers 26 to move downwardly upon the tracks 23 and thus swing the gate automatically into closed position, the weight of the gate being sufficient to detach the projection 54 from the depression 53.

It will be obvious that the gate may be actuated by a vehicle approaching from either direction. It will also be obvious that the gates may be independently opened by depressing one only of the slatted devices. Thus when a motor cycle is approaching, the latter is run upon one of the depressing devices, and the gate immediately in front of the depressed device only opened. Should a person approach on foot, either one of the gates may be readily released by manipulating the small lever 34, as before described. By forming the coupling members 51 of resilient material, they will yield sufficiently to prevent the slight change of the centers between the pivots 46 and the pivots 44 from cramping of parts.

Located in the bottoms of the pits 35 are bearing members 55 to receive the rail members of the platforms, when the latter are depressed, to limit their downwardly movement and to prevent them from being depressed below the general surface of the surrounding road-bed.

The improved device is simple in construction, can be inexpensively manufactured and adapted to gates of varying sizes and to gates constructed of different materials without material structural change.

Having thus described the invention, what is claimed as new is:

1. In an apparatus of the class described, a gate mounted to swing over a gate-way opening and movable vertically, a track inclined laterally and transversely of the gateway opening, a bearing member carried by the gate and engaging said track, an arm mounted to swing vertically into engagement with the gate to simultaneously elevate the gate and move it toward open position and causing the bearing member to traverse said track, and means for actuating said swinging arm.

2. In an apparatus of the class described, a gate mounted to swing over a gate-way opening and movable vertically, a track inclined laterally and transversely of the gateway opening, a bearing member carried by the gate and engaging said track, a vertically swinging arm in constant engagement with said gate, and means for actuating said swinging arm to cause it to simultaneously elevate said gate and move it toward open position to cause the bearing member to traverse said track and complete the elevation and swinging movement of the gate.

3. In an apparatus of the class described, a gate mounted to swing over a gate-way opening and movable vertically, a track inclined laterally and transversely of the gateway opening, a bearing member carried by the gate and engaging said track, a support having a rod upon which said gate is vertically slidable, an arm swinging vertically upon said support and in constant engagement with said gate, and means for actuating said arm to cause it to swing the gate toward open position and cause the bearing member to traverse said track.

4. In an apparatus of the class described, a gate mounted to swing and movable vertically, a track adjacent to the gate and inclined transversely and longitudinally thereof when in closed position, a bearing member carried by said gate and engaging said track, a member mounted to swing vertically into engagement with the gate to simultaneously elevate the gate and move it toward open position, and means for actuating the swinging member.

5. In an apparatus of the class described, a gate mounted to swing and movable vertically, a track adjacent to the gate and inclined transversely and longitudinally thereof when in closed position, a bearing member carried by said gate and engaging said track, a body having a vertical guide member engaged by said gate, a member mounted to swing vertically relative to said body and into engagement with the gate to simultaneously elevate the gate and move it toward open position, and means for actuating the swinging member.

6. In an apparatus of the class described, a support having guide devices, a gate slidable and rotative relative to said guide devices, a track carried by said support and inclined transversely and longitudinally of the gate when in closed position, a bearing member carried by said gate and engaging said track, a support having a rod upon which said gate is vertically slidable, an arm swinging upon said support and in constant engagement with said gate, and means for actuating said arm to cause it to swing said gate toward open position and causing said bearing member to traverse said track.

7. In an apparatus of the class described, a support including an upper and lower guide device, a gate slidably and rotatively engaged by one of its vertical members through said lower guide device, a guide rod carried by said gate and rotative and slidable through said upper guide device, a track carried by said support and inclined transversely and longitudinally of the gate when the same is in closed position, a bearing member carried by said gate and engaging said track, a vertically swinging arm in constant engagement with said gate, and means for actuating said swinging arm to cause it to simultaneously elevate said gate and move it toward open position to cause the bearing member to traverse said track and complete the elevation and swinging movement of the gate.

8. In an apparatus of the class described, a platform formed in co-acting portions each mounted to swing at its outer end and swingingly coupled at their confronting ends by a pivot rod, a rigid lever pivotally supported intermediate its ends and adapted to be engaged with the gate operating means, and a resilient rod connected to said lever and slidably engaging the pivot rod of the platform portions.

9. In an apparatus of the class described, a gate mounted to swing and movable vertically and provided with a downwardly directed locking rib, a track adjacent to the gate and inclined transversely and longitudinally of the same when in closed position, a bearing member carried by said gate and engaging said track to move the gate into full open position, a body having a vertical guide member movably engaged by said gate and provided with a socket to receive the locking rib of the gate when the same is in open position, a member mounted to swing vertically into engagement with the gate to move the gate toward open position and to simultaneously elevate the same, and means for actuating the swinging member to move the bearing member of the track.

10. In an apparatus of the class described, a support including guide devices, a gate including a member journaled in said guide devices and slidable through the same, a sleeve rotative relative to the gate, an arm mounted to swing relative to said sleeve and engaging said gate, and means for forcibly swinging said arm against the gate to move the same toward open position.

11. In an apparatus of the class described, a support including guide devices, a gate including a member journaled in said guide devices and slidable through the same, a track carried by said support and inclined transversely and longitudinally of the gate when in closed position, a traveler device carried by said gate and engaging said track, a sleeve rotative relative to the gate, an arm mounted to swing relative to said sleeve and engaging said gate, and means for forcibly swinging said arm against the gate to move the same toward open position and cause the traveler device to move over said tracks and elevate the gate.

12. In an apparatus of the class described, a support including guide devices, a gate including a member journaled in said guide devices and slidable through the same, a sleeve rotative relative to the gate, an arm mounted to swing relative to said sleeve and engaging said gate, a movable platform adapted to be actuated by a vehicle approaching the gate, and a lever device pivoted, respectively, to said platform and to said arm to forcibly move said arm against the gate to move the same toward open position.

13. In an apparatus of the class described, a support including guide devices, a gate including a member swinging in said guide devices and slidable through the same, a rod slidable relative to said swinging gate member, a stud carried by said rod, an arm mounted to swing upon said stud, and means operative by a moving element for forcibly swinging said arm against the gate to move the same toward open position.

In testimony whereof I affix my signature in presence of two witnesses.

JOHN T. KENT [L. S.]

Witnesses:
J. J. WOOD,
M. V. WILDESEN.

Copies of this patent may be obtained for five cents each, by addressing the "Commissioner of Patents, Washington, D. C."